United States Patent
Yamazaki et al.

(10) Patent No.: US 7,273,999 B2
(45) Date of Patent: Sep. 25, 2007

(54) DUSTPROOF DEVICE OF LIGHT PATH SYSTEM IN LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 11/538,842

(22) Filed: Oct. 5, 2006

(65) Prior Publication Data
US 2007/0098434 A1   May 3, 2007

(30) Foreign Application Priority Data
Oct. 31, 2005   (JP)   ............... 2005-315601

(51) Int. Cl.
*B23K 26/02* (2006.01)
(52) U.S. Cl. ............... 219/121.78; 219/121.6
(58) Field of Classification Search ........... 219/121.78, 219/121.6; 74/37, 89.2
See application file for complete search history.

(56) References Cited

U.S. PATENT DOCUMENTS

| | | | |
|---|---|---|---|
| 4,704,913 A * | 11/1987 | Zimmer | ............... 74/89.17 |
| 5,472,367 A | 12/1995 | Slocum et al. | |
| 6,310,317 B1 * | 10/2001 | Remue | ............... 219/121.69 |

FOREIGN PATENT DOCUMENTS

| | | |
|---|---|---|
| EP | 1 566 235 | 8/2005 |
| EP | 1566235 A1 * | 8/2005 |
| JP | 1-245991 * | 10/1989 |
| JP | 2005-297029 | 10/2005 |
| WO | 01/32350 | 5/2001 |

OTHER PUBLICATIONS

European Search Report for corresponding Application No. 06 40 5406 dated Mar. 20, 2007.

* cited by examiner

*Primary Examiner*—M. Alexandra Elve
(74) *Attorney, Agent, or Firm*—Renner, Otto, Boisselle & Sklar, LLP

(57) ABSTRACT

The invention provides a laser beam machine having a light path duct with improved dust proof property. A light path system 1 of a laser beam machine comprises a light path duct 10 having a U-shaped cross-section with the upper end opened, wherein the opening portion is covered by a steel belt 30. The laser beam extraction unit 50 traveling on the light path duct 10 in the direction of arrow A elevates the steel belt 30 and extracts the laser beam from the light path duct 10. The steel belt 30 has a guiding projection 32 disposed at the center thereof. The laser beam extraction unit 50 has a guide roller 64 disposed below the steel belt 30 and a guide roller 62 having a V-shaped groove 62*a* for engaging the projection on the steel belt 30, thereby preventing displacement of the steel belt.

3 Claims, 3 Drawing Sheets

DUSTPROOF DEVICE OF LIGHT PATH SYSTEM IN LASER BEAM MACHINE

The present application is based on and claims priority of Japanese patent application No. 2005-315601 filed on Oct. 31, 2005, the entire contents of which are hereby incorporated by reference.

BACKGROUND OF THE INVENTION

1. Field of the Invention

The present invention relates to a dustproof device of a light path system disposed in a laser beam machine and the like.

2. Description of the Related Art

A laser beam machine includes a laser beam path system for supplying laser beam output from a fixed laser oscillator to a machining head moving at high speed.

The laser beam machine for realizing the present invention is equipped with a bed for housing pallets on which workpieces are placed, a column guided via guide rails disposed on both sides of the bed and moving at high speed along the longitudinal direction of the head, and a machining head moving at high speed on guide rails disposed on the column in the direction orthogonal to the direction of movement of the column.

The laser beam path system disposed on the laser beam machine comprises a light path duct disposed along the longitudinal direction of the bed, and a laser beam extraction unit that moves in synchronization with the column for extracting the laser beam passing through the light path duct and sending the same toward the column.

The light path duct is a member having a U-shaped cross-section with the upper portion opened, and in the interior thereof is irradiated a laser beam. A dustproof device is adopted, in which the upper surface of the light path duct is covered by a steel belt, and the steel belt is elevated via a guide roller only where the laser beam extraction unit passes, so as to enable the laser beam to be extracted.

Japanese patent application No. 2004-118483 discloses a dustproof unit of a laser beam machine filed by the present applicant.

In the dustproof unit of a laser beam machine disclosed in the above-mentioned patent application, a belt-like magnet is disposed on both sides of the light path duct, attracting the steel belt and preventing foreign substances from entering the duct.

However, there is a drawback in that when the laser beam extraction unit passes, the steel belt is forcibly elevated by the guide roller, and when it is lowered onto the magnet after the passing of the extraction unit, the belt is displaced and not returned to its original position.

This displacement of the return position of the steel belt accompanying the raising and lowering of the steel belt causes dust to be generated by friction with the guide roller, which causes deterioration of the dustproof operation and also causes damage to the steel belt when the laser beam extraction unit passes at high speed.

SUMMARY OF THE INVENTION

The object of the present invention is to provide a dustproof mechanism of a laser beam machine that solves the problems of the prior art mentioned above.

In order to achieve the above object, the present invention provides a dustproof device of a light path system provided in a laser beam machine comprising a light path duct with an upper portion opened through which laser beam passes, a belt covering the opening of the light path duct, and a laser beam extraction unit traveling along the light path duct and extracting the laser beam by elevating the belt, wherein the belt has a guiding projection formed at a center portion of the upper surface thereof, and the laser beam extraction unit has a guide roller with a groove engaged with the projection on the belt.

Furthermore, the belt in the dustproof device is a steel belt, and the device further comprises a magnetic belt member for attracting both side portions of the steel belt disposed on the upper surface of the light path duct.

Even further, the laser beam extraction unit comprises a guide roller for pressing the belt onto the light path duct, a straight roller disposed on the lower side of the belt and guiding the belt to an elevated position, and a guide roller disposed on the upper side of the belt and sandwiching the belt with the straight roller.

According to the present invention arranged as described above, a guiding projection is formed on the upper surface of the steel belt covering the upper opening of the light path duct, and the laser beam extraction unit extracts the laser beam by traveling on the light path duct and elevating the belt. The laser beam extraction unit is equipped with a guide roller having a groove engaged with the projection on the steel belt, so as to prevent meandering of the steel belt and improve the dust proofing effect of the light path system of the laser beam.

DETAILED DESCRIPTION OF THE PREFERRED EMBODIMENTS

Figure 1:
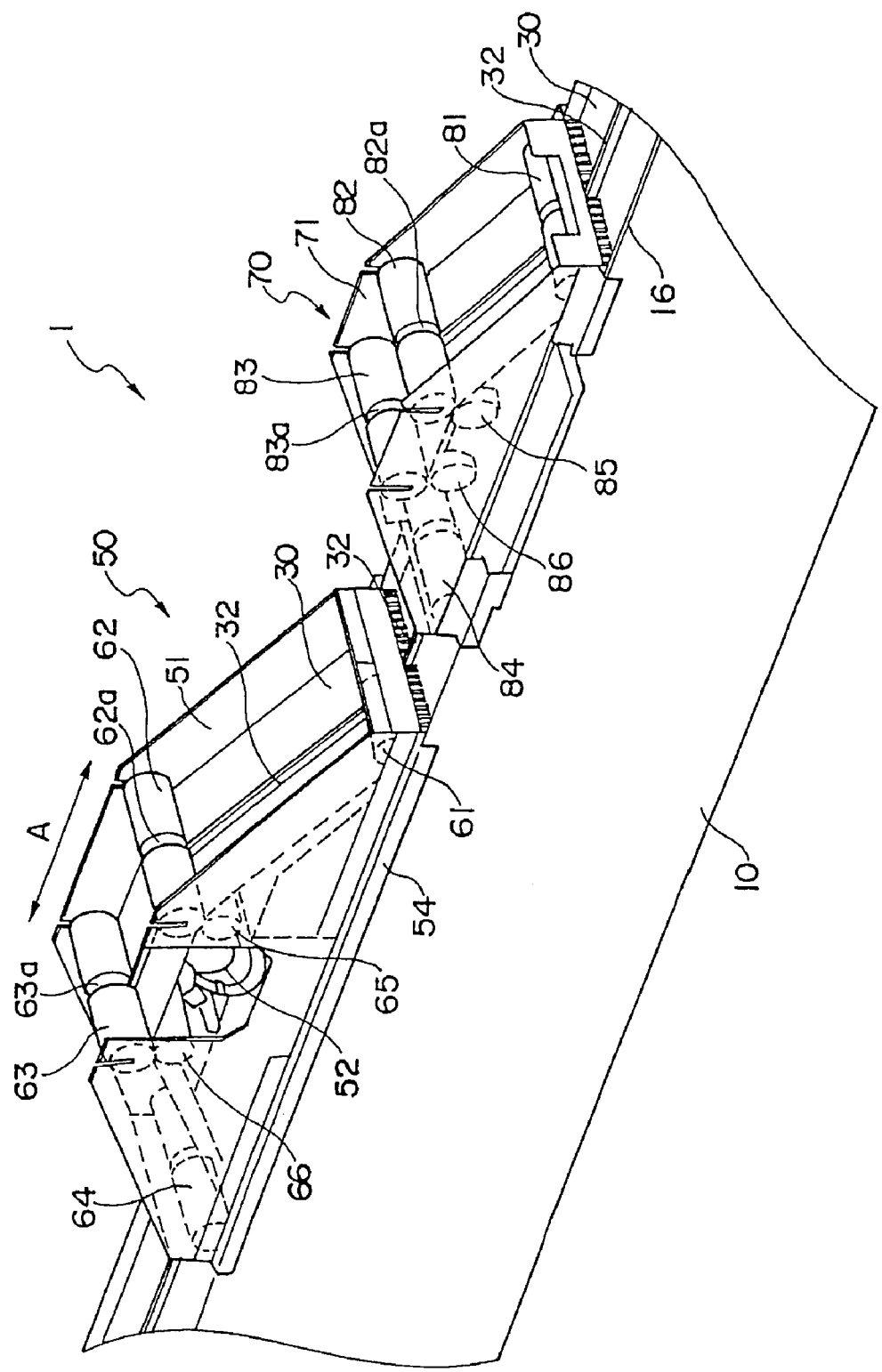
FIG. 1 is a perspective view showing the relevant portion of a light path system of the laser beam machine.
Figure 2:
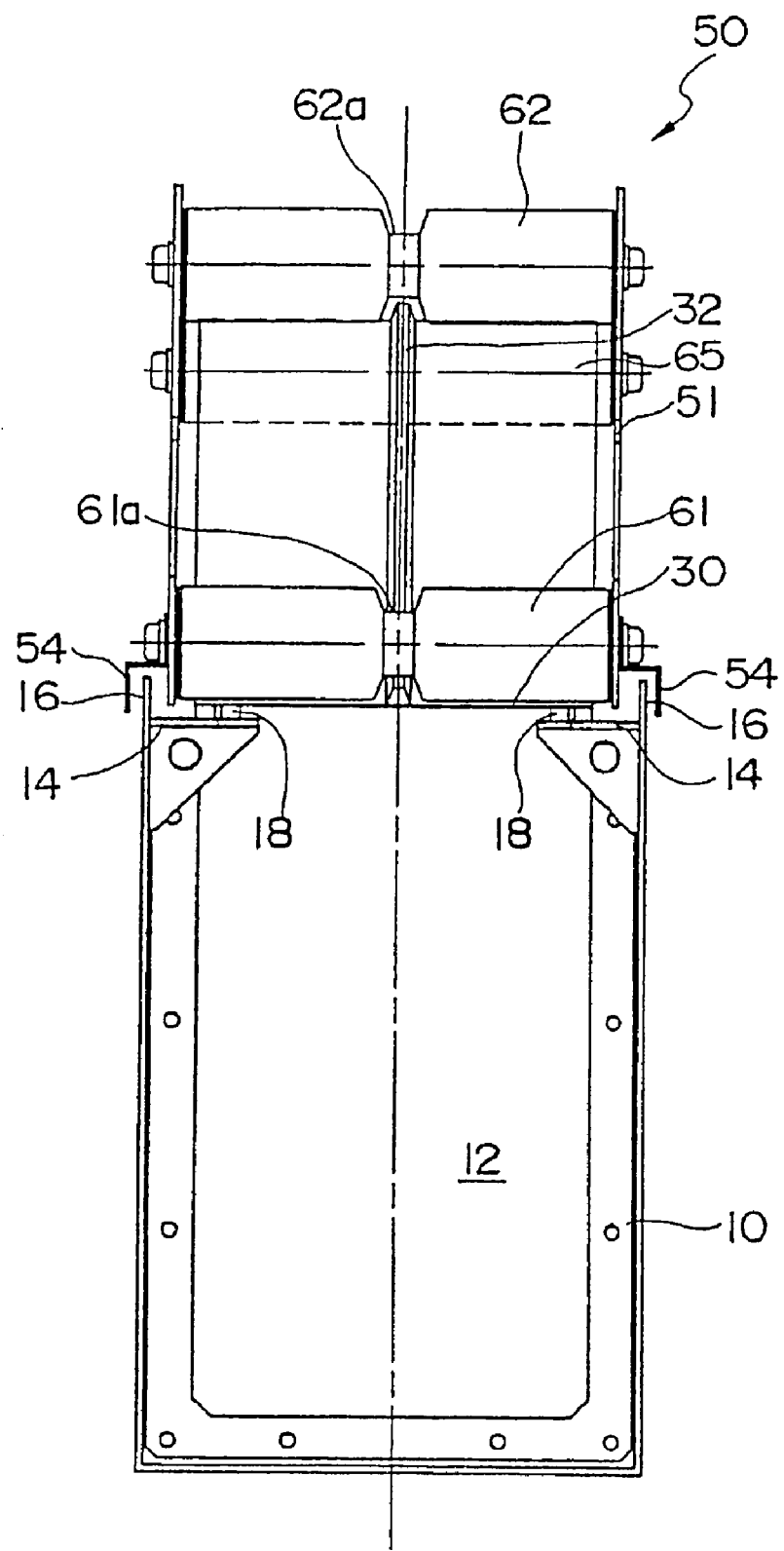
FIG. 2 is a cross-sectional view of a light path duct.
Figure 3:
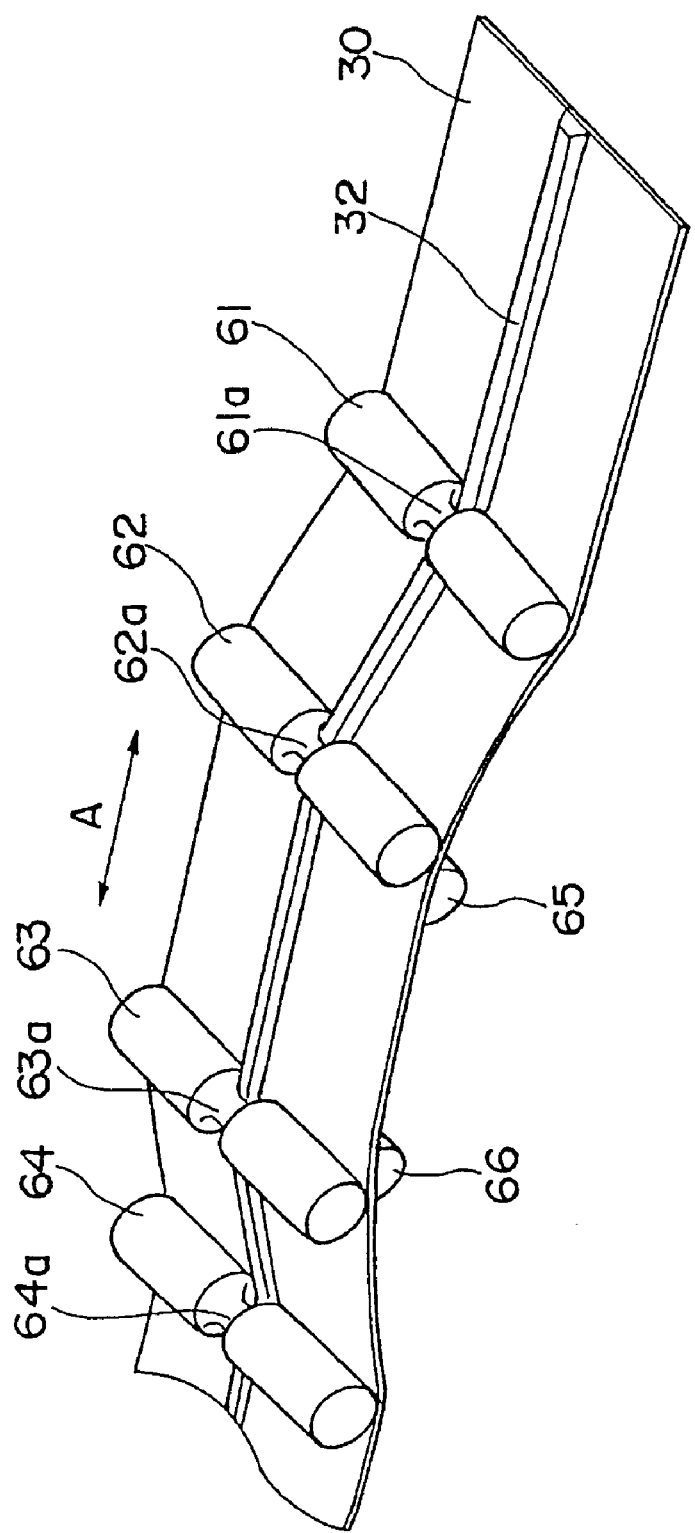
FIG. 3 is an explanatory view showing the steel belt and the guide roller.

FIG. 1 is a perspective view showing the relevant portion of a light path system of the laser beam machine according to the present invention, FIG. 2 is a cross-sectional view of the light path duct, and FIG. 3 is an explanatory view of the steel belt and the guide roller for realizing a dustproof arrangement.

The light path system of a laser beam machine denoted as a whole by reference number 1 has a light path duct 10 and a laser beam extraction unit 50 and 70 that moves at high speed on the light path duct in the direction of arrow A. Necessary devices such as a mirror 52 and the like are disposed on the laser beam extraction unit 50.

As shown in FIG. 2, the light path duct 10 has a substantially U-shaped cross-sectional shape, forming therein a space 12 through which laser beam passes. The upper portion of the light path duct 10 is opened, with flanges 14 formed on both inner sides of the upper end thereof. On the upper surface of the flange 14 is disposed a magnetic rubber belt 18 formed for example by impregnating rubber with magnetic powder material.

The magnetic rubber belt 18 attracts the lower surface on both side ends of a steel belt 30 covering the upper opening of the light path duct 10, preventing foreign substances from entering the light path duct 10.

A guiding projection 32 is disposed on the center portion of the upper surface of the steel belt 30. This projection 32 is formed for example by forming a belt-like body from rubber material and bonding the same via an adhesive or the like on the upper surface of the steel belt 30.

FIGS. 1 through 3 illustrate the layout of guide rollers disposed on the laser beam extraction unit 50.

The laser beam extraction unit 50 has six guide rollers mounted to a frame 51. Four guide rollers 61, 62, 63 and 64 disposed on the upper side of the steel belt 30 has V-shaped grooves 61a, 62a, 63a and 64a formed respectively on the center area thereof.

The grooves on the guide rollers are engaged with the projection 32 on the steel belt 30, restricting the lateral movement of the steel belt 30. Guide rollers 62 and 63 form a space for extracting the laser beam in the upper direction from the light path duct 10 by elevating the steel belt 30. In order to realize this arrangement, straight rollers 65 and 66 for sandwiching and guiding the steel belt together with the guide roller 62 are disposed on the lower side of the steel belt 30 under the guide roller 62. Since the straight roller 65 contacts the lower surface of the steel belt having no projection, a cylindrical straight roller is used.

Dust proofing walls 16 are formed above the flanges 14 of the light path duct 10. A skirt unit 54 covering the upper end the walls 16 is disposed below the frame 51 of the laser beam extraction unit 50. In other words, a so-called labyrinth structure is created between the fixed walls 16 and the moving skirt unit 54, by which foreign substances are prevented from entering the light path 12.

What is claimed is:

1. A dustproof device of a light path system provided in a laser beam machine comprising:
    a light path duct with an upper portion opened through which laser beam passes;
    a belt covering the opening of the light path duct; and
    a laser beam extraction unit traveling along the light path duct and elevating the belt to extract the laser beam;
    wherein the belt has a guiding projection formed at a center portion of the upper surface thereof, and the laser beam extraction unit has a guide roller with a groove engaged with the projection on the belt.

2. The dustproof device of a light path system provided in a laser beam machine according to claim 1, wherein the belt is a steel belt, and further comprising a magnetic belt member for attracting both side portions of the steel belt disposed on the upper surface of the light path duct.

3. The dustproof device of a light path system provided in a laser beam machine according to claim 1, wherein the laser beam extraction unit comprises a guide roller for pressing the belt onto the light path duct, a straight roller disposed on the lower side of the belt and guiding the belt to an elevated position, and a guide roller disposed on the upper side of the belt and sandwiching the belt with the straight roller.

* * * * *